Dec. 31, 1957 A. BUSALA ET AL 2,818,470

COMPENSATED TRANSISTOR CIRCUIT

Filed March 29, 1956

INVENTORS A. BUSALA
L. A. MEACHAM
BY W. L. Kefauver
ATTORNEY 2,818,470
Patented Dec. 31, 1957

1

2,818,470

COMPENSATED TRANSISTOR CIRCUIT

Alessandro Busala, Berkeley Heights, and Larned A. Meacham, New Providence, N. J., assignors to Bell Telephone Laboratories, Incorporated, New York, N. Y., a corporation of New York Application March 29, 1956, Serial No. 574,712

11 Claims. (Cl. 179—81)

Figure 1:
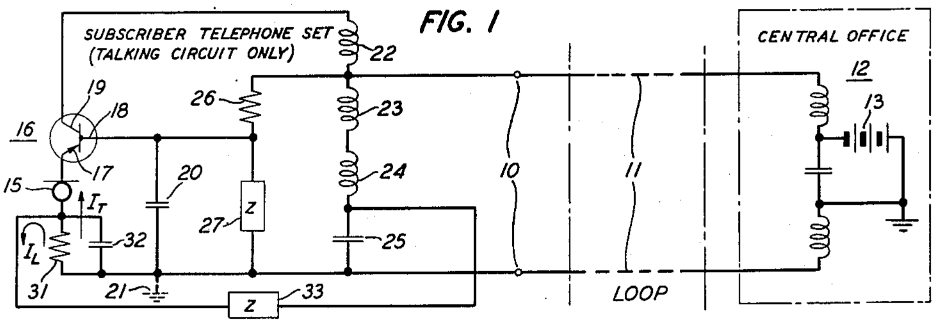

This invention relates in general to transistor regulating circuits and, in the particular embodiments described below for purposes of illustration, to transmission level equalization circuits which may be embodied in telephone systems employing transistors for amplifying transmitted speech currents.

Substation circuits are generally interconnected by telephone lines which lead either to a central office or to another exchange, such as a private branch exchange. In common battery systems, the necessary direct current required at the various substation circuits is supplied from a source of direct current at the central office, or exchange, over the connecting telephone lines. As a general rule, substation subscribers are located over a wide range of distances from their central office or exchange. With a universal substation circuit, there would be a corresponding wide range in the level of the signals transmitted by the subscribers unless means were employed to compensate for the variations in loop length.

Such means have, in the past, been provided and are generally known as transmission level equalization circuits. These circuits, in general, act to decrease the transmission level on shorter loops while affecting to a lesser degree the transmission level of subscribers on longer loops. Among the various ways proposed in the past to accomplish such equalization are those which utilize nonlinear resistance elements, such as thermistors and varistors which heretofore have variously been shunted across either the transmitter itself or the substation line terminals.

In certain electronic systems, however, the values of loop currents, and attendant variations with loop length are so small that these prior art methods do not afford the necessary degree of equalization.

An object of the present invention is to maintain the transmission level of a plurality of telephone subscribers substantially constant regardless of loop length, and even though the range of loop currents encountered is very small.

Another object of the invention is to provide transmission level equalization without an undue loss of power.

Another object of the invention is to improve the sensitivity of transmission equalization circuits.

Other objects of the invention relate, alternatively, to the achievement of either a uniform set current, or, a uniform set resistance regardless of loop length.

In an illustrative embodiment of the invention, described in more detail below, transmitted speech currents are amplified by a transistor amplifier which is powered by direct current from the central office. The transmitter, whose power output is roughly a linear function of current squared, is connected for direct currents in series with the emitter electrode of the transistor, as well as in series with a bias stabilizing resistor. This resistor acts, by negative feedback, to stabilize the emitter current. In accordance with principles of the invention, a current, derived from the line, is caused to flow through the biasing resistor by an auxiliary circuit path which is independent of both the transistor and the transmitter. The transistor, by negative feedback tends to hold the voltage drop across this resistor constant for a given value of base biasing voltage. This voltage, however, is made up of two components, one provided by the transistor, i. e., emitter, current and the other by current from the auxiliary path just mentioned. Since the auxiliary path current is greater on short loops than on long, the emitter current and hence the current in the carbon transmitter is increased as the loop length increases. Thus, the desired equalization is obtained.

In one specific embodiment, also described in more detail below, a substantially constant biasing voltage is applied to the base, i. e., between the base and "ground," of all substation sets, so that each draws substantially the same loop current. In this embodiment, the equalizing, or auxiliary circuit path, is largely resistive so that the auxiliary, or equalizing current, varies inversely in a linear manner with loop length.

In another specific embodiment, also described below, the biasing voltages are applied to the transistors of the various substation circuits by resistive voltage dividers. By this means, each substation circuit draws a current proportional to its terminal voltage and thus all substations will appear to the central office to have substantially the same set resistance. In this embodiment, since the emitter current itself varies linearly with loop length, the auxiliary, or equalizing current, is caused to vary inversely in a nonlinear manner to provide the desired equalization. This is accomplished by including in the equalizing circuit nonlinear resistance elements whose resistance decreases rapidly with increasing currents.

Figure 2:
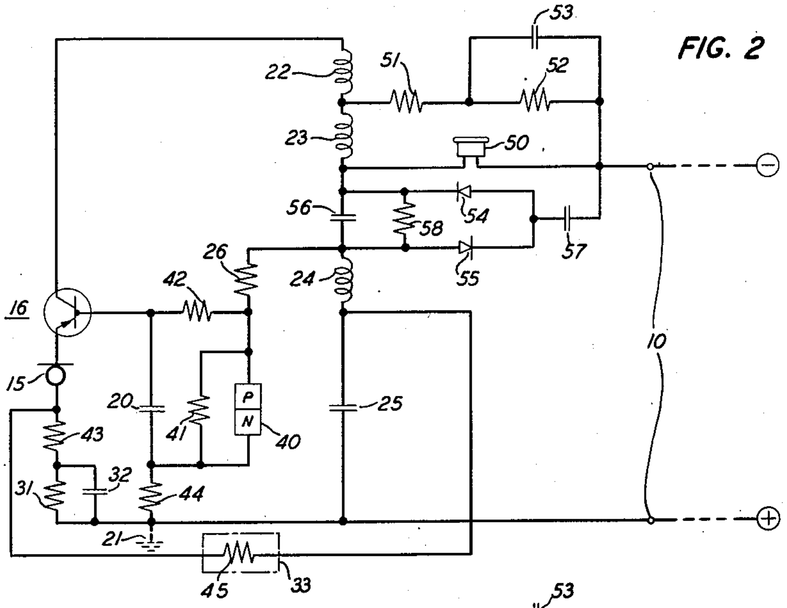
Figure 3:
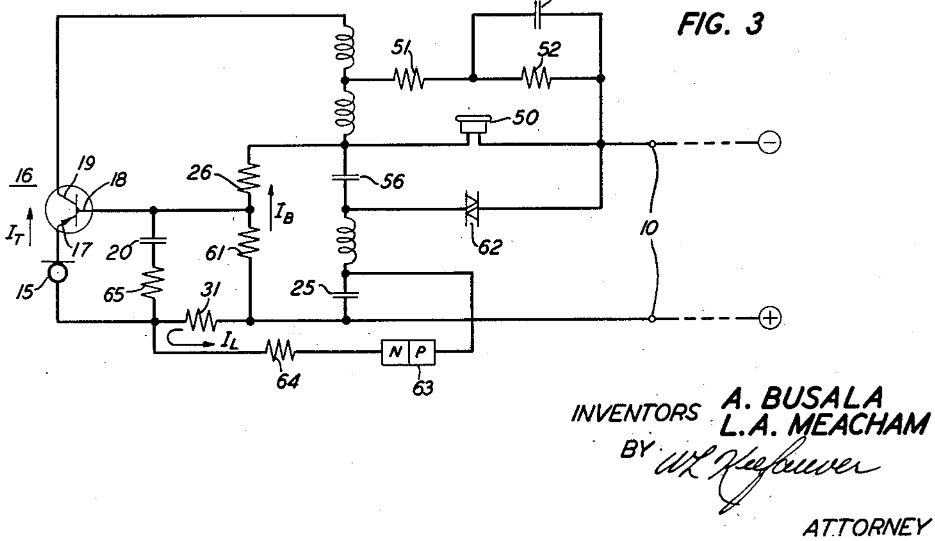

These and other objects, as well as the various features of the invention, will be more fully understood from a reading of the following detailed description taken in accordance with the attached drawing in which:

Fig. 1 is a simplified schematical diagram of the talking circuit only of a subscriber telephone set embodying principles of the invention;

Fig. 2 is a detailed schematical diagram of a substation circuit embodying principles of the invention and which is designed to draw substantially the same current from the central office regardless of loop length; and Fig. 3 is a detailed schematical diagram of a substation circuit embodying principles of the invention which is designed to reflect substantially the same resistance to the central office regardless of loop length.

Broader aspects of the invention may be appreciated by first considering Fig. 1. This figure shows the talking circuit only of a substation circuit whose set terminals 10 are connected by a transmission line or loop 11 to a central office 12. Included at the central office is a source of direct current 13 which provides the operating voltages and currents for all of the subscribers connected to the office.

In an electronic switching system, in which the present invention might well find application, the direct currents drawn by the substation circuits are very small and, in fact, on the order of 10 milliamperes. With such small currents, the output of the carbon microphone 15, unmodified, would be very low. The transmitted speech currents are therefore, amplified by a transistor 16 having an emitter 17, a base 18, and a collector 19. So far as speech currents are concerned, the transistor is connected in common base configuration by virtue of the capacitor 20. The load is coupled between the collector 19 and what, for discussion purposes, may be considered an alternating-current "ground" at point 21 by an auto-transforming arrangement comprising the line coils 22, 23, and 24 which may have a winding ratio of 1:1:1. This auto-transformer arrangement, it might be noted, effectively steps up the alternating-current loop impedance to a value properly related to the relatively high collector impedance of the transistor so as to achieve maximum modulation efficiency. This is more fully disclosed in a copending application of L. A. Meacham, Serial No. 461,145, dated October 8, 1954. Capacitor 25 serves to block direct currents.

The transistor is biased, however, in what might be considered common emitter configuration with all operating voltages derived from the source 13 by a voltage divider comprising resistor 26 and impedance 27. The collector is connected to one end of the divider, the emitter to the other end, and the base to a junction intermediate resistor 26 and impedance 27. Element 27 has been generically designated an impedance for reasons which will become apparent later.

For the purpose of stabilizing the emitter current against variations in $I_{CO}$, temperature or the like, a biasing resistor 31 is connected in series with the transmitter and in the direct-current emitter-base path. Stabilization is provided by the negative feedback voltage developed across this resistor. This resistor is by-passed by a capacitor 32 for speech currents and acts much in the manner of a cathode biasing resistor. It is sufficient in magnitude, however, so that the potential of the emitter tends to approach that of the base and is held thus by the negative feedback action.

In accordance with principles of the invention, transmission equalization is obtained by causing a current independent of both the transistor and the transmitter to flow through this biasing resistor. This current is derived from the line by an auxiliary circuit including an impedance 33. It should be noted that this auxiliary path, which may be traced from the negative line terminal through coils 23 and 24, impedance 33, resistor 31, and thence to the positive line terminal, is independent of both the transistor 16 and the transmitter 15. With the addition of this auxiliary circuit, the total current in the biasing resistor 31 is composed of two parts designated $I_T$, the transistor component, and $I_L$, the line current component.

If impedance 27 is a constant voltage device, i. e., one whose voltage is relatively independent of applied current, the negative feedback action will tend to hold the voltage developed across resistor 31 constant regardless of loop length. The fraction of this voltage due to the line current component, $I_L$, will, however, vary inversely with loop length. Less current will, therefore, be required of the transistor on short loops and, since the transistor current $I_T$ is also the transmitter current, it may be seen that the desired transmitter equalization is obtained. In this case, it may be seen that impedance 33 can be a linear resistor proportioned to draw the proper amount of equalizing current from the line through resistor 31.

If the impedance device 27 is a linear element, such as a resistor, the voltage developed across resistor 31, which tends to approach the voltage across resistor 27, will vary linearly with loop length. In such a case, the auxiliary current $I_L$ is caused to vary nonlinearly; for example, by an impedance device 33 whose resistance decreases rapidly with increases in line current, so that the equalizing current $I_L$, on short loops, will increase faster than the increase in the voltage across impedance 27.

A specific circuit designed to draw a current from the central office, which is independent of loop length, is illustrated in Fig. 2. Elements similar to those in Fig. 1 have been similarly numbered. This substation circuit was, in fact, specifically designed to insure a 7.5 milliampere loop current. To insure this current, a substantially constant potential of about 10 volts is applied to the base. This is accomplished by applied a reference potential obtained from a breakdown diode 40, to the base of the transistor. This diode, which may comprise a p–n junction diode of the type described in an article by Messrs. F. H. Chase, B. H. Hamilton, and D. H. Smith entitled "Transistors and junction diodes in telephone power plant," Bell System Technical Journal for July 1954, volume 33, at page 827, is characterized by a reverse breakdown region in which it exhibits a substantially constant voltage regardless of applied current. This device was specifically designed for a breakdown at about 10 volts, and operates, over most of the expected range of loop currents, in its breakdown region, thereby providing a reference potential of 10 volts. Since the transistor is self biasing, due to resistor 31, the potential across the diode is approximately duplicated across resistor 31, which has a value of about 1400 ohms, thus insuring a 7.5 milliampere set current. (These potentials are measured with respect to the arbitrary reference point 21 shown in Figs. 1 and 2.) Diode 40, therefore, cooperates with resistor 26 to form a voltage divider across the line for the purpose of supplying the proper operating voltages to the electrodes of the transistor 16.

On longer loops, or when two or more sets are off-hook on the same loop, the collector potential tends to approach that of the base. This would result in over-load distortion of the voice signal. In order to correct this condition, a resistor 41 is bridged across the diode to guarantee the existence of a base-collector voltage sufficient for proper operation.

On longer loops, the terminal voltage may be insufficient to maintain breakdown in diode 40. For currents above breakdown, the alternating-current resistance of the diode 40 is substantially zero. For currents below this value, diode 40 has a very large alternating-current impedance; capacitor 20, however, effectively by-passes this high impedance.

In the region of the knee of the breakdown characteristic of diode 40, an effect similar to noise is realized. To reduce this noise, a resistor 42 is placed in series with the base to effectively absorb the noise voltage.

For the carbon transmitter 15 to operate efficiently, it should be loaded by an impedance approximately equal to its resistance with no sound pressure. In the illustrated circuit, this necessitated the addition of a small unbypassed resistor 43 in series with the transmitter, together with the larger resistor 31 which is by-passed by capacitor 32.

Since the output impedance of a common base transistor amplifier is much higher than the loop impedance, a small amount of negative feedback is introduced to lower this output impedance so as to more nearly match the impedance of the loop which is on the order of one thousand ohms. This feedback is conveniently obtained by including a resistor 44 in series, for speech currents, with the parallel combination of capacitor 20 and diode 40—resistor 41. These elements, together with resistor 26, form a voltage divider, for speech currents, across that part of the output appearing across coil 24 (roughly one-third of the output), with the voltage appearing across resistor 44, due to the output signal, being of such phase as to apply a small negative feedback voltage to the base. Resistor 44 tends to upset the constant base voltage condition which diode 40 attempts to achieve but has such a small value relative to the direct-current resistance of the diode 40—resistor 41 combination that its effect in this respect is negligible.

Since a substantially constant biasing voltage is applied between the base and reference point 21, the auxiliary, or equalizing circuit, includes merely a linear resistor 45. As described in connection with Fig. 1, this circuit causes a component of current $I_L$ from the line to flow through the biasing resistor 31 to the end result that the transistor regulates the transmitter current to the proper value. It may be noted, however, that the net current drawn from the loop is not disturbed by this arrangement.

The receiving circuit, also shown in Fig. 2, comprises a conventional receiver 50 together with a sidetone balancing network comprising resistors 51 and 52, the latter being shunted by a capacitor 53. Receiving equalization is accomplished by shunting the receiver with an impedance which increases with increasing loop lengths. To obtain this condition, a pair of varistors 54 and 55, connected in series for direct currents but in shunt for alternating currents, is connected across the receiver. The series direct-current path may be traced from the negative line terminal through the receiver 50, winding 24, and resistors 45, 43, and 31 back to the positive line terminal. The varistors 54 and 55 are placed in parallel with the receiver by capacitors 56 and 57.

On short loops, the direct current flowing through the varistors is high, thus reducing the alternating-current shunt resistance across the receiver and thereby the alternating power delivered to the receiver. On long loops, the varistor current is low, resulting in high receiving efficiency. The degree of equalization is determined by the value of resistor 58 which shunts the two varistors for direct currents. Optimum equalization may be obtained by a judicious selection of value for this resistor which is dependent, for example, on the range of loop lengths to be equalized, the resistances of the varistors themselves, etc.

This particular receiving equalization circuit is the subject of a copending application, L. A. Meacham, Serial No. 574,713, filed of even date herewith. It is particularly useful where the expected range of loop currents is unusually small. In such a case, it has been found that copper oxide varistors have the required degree of curvature in their voltage-current characteristic. By connecting two such varistors in series for direct currents and in parallel for alternating currents, second order distortion is prevented; such distortion might otherwise result where the ratio of signal current swing to direct-current variation, is relatively large.

The principles of the invention are also applicable where it is desired to have the various substation circuits appear at the central office to have the same resistance rather than to draw a constant current, as in the Fig. 2 embodiment. Such a circuit is shown in Fig. 3. In this circuit, the biasing voltages are derived by a simple resistance voltage divider comprising resistors 26 and 61. With this circuit, the base 18 is held at a constant fraction of the loop voltage by means of this voltage divider so that the current drawn by the circuit from the loop is proportional to the terminal 10 voltage of the circuit. Again, however, the transistor 16 regulates the flow of current through the biasing resistor 31 which again is in series, for direct currents, with the emitter 17 and transmitter 15. The regulating current in this case, however, is caused to vary more rapidly with line voltage than the line current by including in the auxiliary, or equalizing, path a varistor 62, a breakdown diode 63, and a small linear resistor 64. The varistor 62, which also provides receiving equalization, has a resistance which varies nonlinearly with the current. Also, the breakdown diode 63, while having a substantially constant alternating-current resistance in its breakdown condition, has a direct-current resistance which varies widely with applied current in its breakdown condition. Thus, if the loop length were decreased, the transistor would, on the one hand, tend to increase the transmitter current since its base voltage would increase, but on the other hand, the net change is a decrease in transmitter current since the rapidly increasing auxiliary current provides an increasing amount of voltage drop across resistor 31, thus requiring less current from the transistor.

The current $I_L$ varies as an inverse function of loop length much more rapidly in the circuit shown in Fig. 3 than in that of Fig. 2. It was thus possible to obtain adequate receiving equalization by a simple silicon carbide varistor 62 shunted, for signal currents, directly across the receiver 50. As noted above, this varistor serves the dual function of providing receiving equalization and also contributing to the necessary nonlinearity of the equalizing current, provided primarily by diode 63, so that the proper degree of transmitting equalization is obtained.

It is also noted that the change in location of resistor 31 over that shown in Figs. 1 or 2 permits the saving of a capacitor by leaving this resistor unbypassed. Its resistance value is fairly small, however, so as to have a negligible effect on transmitting efficiency.

It is noted also that in this embodiment, the relatively small valued resistor 65, in series with capacitor 20, provides the small amount of negative feedback required to reduce the set resistance to a desired value.

Within the set, the line current divides into three parts; $I_B$, flowing through the biasing resistors 26 and 61, $I_L$, flowing through the varistor 62, diode 63, and resistors 64 and 31, and $I_T$, flowing through the collector and emitter electrodes of the transistor. It should be noted that the emitter current $I_T$, which energizes transmitter 15, decreases with decreasing loop resistance, thus lowering the transmitting sensitivity on short loops. Conversely, the varistor current $I_L$ increases as zero loop length is approached, thus shunting down the receiver on short loops and reducing its sensitivity.

The biasing current $I_B$ is a fairly large fraction of the total. This is essential, since unless resistors 26 and 61 are of sufficiently low resistance, changes in base voltage, caused by different values of $I_{CO}$ (the collector current with zero emitter current), may be large enough to affect the regulation of $I_L$ and $I_T$. Further, if the resistance in the base circuit were high enough in relation to the effective resistance of the emitter circuit, taking account of the nonlinear elements in the path of $I_L$, thermal instability might exist at high temperatures. This instability arises, for example, by an increase in $I_{CO}$ which changes the base potential, causing an increase in collector current. The resulting rise in collector dissipation would give an increased junction temperature which in turn would increase $I_{CO}$. With the list of component values given below, it was found that ample margins against this effect are provided except under very extreme conditions.

To give a more complete understanding of the invention, a list of certain component values found to be satisfactory for the two embodiments illustrated are given below. The invention, however, is not limited to these specific values.

*Figure 2*

| | |
|---|---|
| Transistor 16 | Type 1778 p-n-p. |
| Transmitter 15 resistance (zero sound pressure) | 100 ohms (average). |
| Resistor 43 | 62 ohms. |
| Resistor 31 | 1400 ohms. |
| Capacitor 20 | 0.5 microfarad. |
| Resistor 26 | 27,000 ohms. |
| Diode 40 | Silicon junction diode; 10 volt breakdown. |
| Resistor 41 | 80,000 ohms. |
| Resistor 42 | 2000 ohms. |
| Resistor 44 | 1500 ohms. |
| Resistor 45 | 4700 ohms. |
| Resistor 51 | 300 ohms. |
| Resistor 52 | 1800 ohms. |
| Capacitor 53 | 0.12 microfarad. |
| Resistor 58 | 160 ohms. |
| Capacitors 32, 25, 56, and 57 | 4 microfarads. |
| Set current | 7.5 milliamperes. |

*Figure 3*

| | |
|---|---|
| Transistor **16** | Type 1778 p-n-p. |
| Transmitter **15** resistance (zero sound pressure) | 100 ohms (average). |
| Resistor **31** | 560 ohms. |
| Capacitor **20** | 4 microfarads. |
| Resistor **26** | 2400 ohms. |
| Resistor **61** | 820 ohms. |
| Resistor **65** | 75 ohms. |
| Diode **63** | Silicon junction diode; 9.4 volt breakdown. |
| Resistor **64** | 360 ohms. |
| Resistor **51** | 300 ohms. |
| Resistor **52** | 1800 ohms. |
| Capacitor **53** | 0.12 microfarad. |
| Capacitors **25**, **56** | 4 microfarads. |
| Set resistance (effective resistance across terminals **10**) | 1500 ohms. |

Although ringing or signalling circuits have not been shown in the illustrated circuits to avoid obscuring the invention, they might well take the form of tone ringing circuits disclosed in the applications of J. R. Power, Serial No. 574,718, and L. A. Meacham, Serial No. 574,714, both filed of even date herewith since many of the elements, such as the transistor, certain diodes, resistors, and capacitors, can readily be adapted, by using contacts associated with the plunger-operated switchhooks, to operate alternatively in the signalling circuit when the handset is on-hook, and, in the speech circuits illustrated, when the handset is off-hook.

Although the invention has been described in its relation to certain specific embodiments, the invention should not be deemed limited to these embodiments since numerous other embodiments and modifications will readily occur to one skilled in the art without departing from either the spirit or scope of the invention.

What is claimed is:

1. A transistor having emitter, base, and collector electrodes, a single source of direct current for providing operating voltages for said transistor, a voltage divider comprising a pair of impedance elements connected across said source, means connecting one end of said voltage divider to said emitter, means connecting the junction of said impedance elements to said base, a utilization device and a biasing resistor connected for direct currents in series between said emitter and said base, and circuit means connecting said resistor in a direct current series circuit including at least a portion of said voltage divider but excluding said transistor.

2. A transistor having emitter, base, and collector electrodes, a single source of direct current for providing operating voltages for said transistor, voltage divider means for applying operating voltages from said source to the electrodes of said transistor, a utilization device and a resistor connected in series with said emitter, and a separate circuit for applying current from said source to the junction of said device and said resistor.

3. The combination in accordance with claim 2 wherein said utilization device is connected intermediate to said emitter and said resistor.

4. A transistor having emitter, base, and collector electrodes, a utilization device connected in a direct current path between said emitter and base, a resistor connected in said direct current path, a single source of direct current, means including said resistor for deriving biasing currents for said transistor from said source, and additional means for applying current from said source to the junction of said resistor and said device.

5. A transistor having emitter, base, and collector electrodes, a utilization device connected to said emitter, a single source of direct current, circuit means for applying operating voltages from said source to said transistor, a resistor connected in series with said emitter and said device, said device being intermediate said emitter and said resistor, said resistor tending to hold the direct-current emitter current constant for a given applied operating voltage and circuit means independent of said transistor for applying an auxiliary current through said resistor which is proportional to the magnitude of said operating voltage.

6. In a telephone system comprising a telephone exchange including a source of direct current, a plurality of substation circuits located at various distances from said exchange and each having a pair of terminals, and telephone lines for connecting said substation circuits to said exchange, the combination wherein each of said substation circuits comprises a transmitter powered by direct current from said source, an amplifier for transmitted currents comprising a transistor having emitter, base, and collector electrodes, means for applying biasing voltages from said source to the electrodes of said transistor, means connecting said transmitter in series with said emitter, a resistor connected for direct currents in series with said emitter which tends to hold the net emitter current constant, an impedance element and means connecting said resistor, said impedance element and said source in a series circuit independent of said transmitter and of the electrodes of said transistor.

7. The combination in accordance with claim 6 wherein said impedance element has a non-linear resistance characteristic.

8. The combination in accordance with claim 6 wherein said bias applying means comprises a voltage divider one arm of which comprises a two-terminal device exhibiting a substantially constant voltage across its terminals despite variations in applied current, means for applying the voltage across said device to bias said base with respect to said emitter, and wherein said impedance element comprises a resistor.

9. A telephone system comprising a telephone exchange including a source of direct current, a plurality of substation circuits located at various distances from said exchange and each drawing substantially the same amount of current from said source and telephone lines for connecting said substation circuits to said exchange, the combination wherein each of said substation circuits has a pair of terminals connectible to its associated telephone line and wherein each of said substation circuits comprises a transmitter, a transistor amplifier having emitter, base, and collector electrodes, voltage divider means for applying a biasing voltage derived from said source across said emitter and base electrodes which is relatively independent of the value of the current received from said source, a bias stabilizing resistor connected in series with said emitter, means connecting said transmitter for direct currents in series with and intermediate to said emitter and said resistor, and circuit means connecting said resistor in a series circuit independent of said transistor and across said terminals.

10. In a telephone system comprising a telephone exchange including a source of direct current, a plurality of substation circuits located at various distances from said exchange and each having substantially the same net resistance, and telephone lines for connecting said substation circuits to said exchange, the combination wherein each of said substation circuits has a pair of terminals connectible to its associated telephone line, a transmitter, a transistor having emitter, base, and collector electrodes, resistive voltage divider means for applying biasing voltages to said transistor, the biasing voltages of the various substation circuits being linearly related to their associated terminal voltages, a bias stabilizing resistor connected in series with said emitter, means connecting said transmitter for direct currents in series with and intermediate said emitter and resistor and circuit means independent of said transistor for connecting said resistor in a series circuit across said terminals, said circuit means including a resistance element whose direct-current resistance is a non-linear function of applied current.

11. The combination in accordance with claim 10 wherein the resistance of said resistance element decreases at a faster rate than the rate at which the current from said source at each of said substation circuits increases with decreasing loop length.

References Cited in the file of this patent

UNITED STATES PATENTS

| | | |
|---|---|---|
| 2,666,817 | Raisbeck et al. | Jan. 19, 1954 |
| 2,751,550 | Chase | June 19, 1956 |

FOREIGN PATENTS

| | | |
|---|---|---|
| 1,119,253 | France | Apr. 3, 1956 |